US009302611B2

(12) United States Patent
Yamazaki et al.

(10) Patent No.: US 9,302,611 B2
(45) Date of Patent: Apr. 5, 2016

(54) VEHICLE LAMP CONTROL DEVICE (71) Applicant: KOITO MANUFACTURING CO., LTD., Tokyo (JP)

(72) Inventors: Masashi Yamazaki, Shizuoka (JP); Yusuke Kasaba, Shizuoka (JP); Kazuo Goto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/548,799

(22) Filed: Nov. 20, 2014

(65) Prior Publication Data

US 2015/0142275 A1 May 21, 2015

(30) Foreign Application Priority Data

Nov. 20, 2013 (JP) .................................. 2013-239781

(51) Int. Cl.
*B60Q 1/115* (2006.01)
(52) U.S. Cl.
CPC .......... *B60Q 1/115* (2013.01); *B60Q 2300/112* (2013.01); *B60Q 2300/132* (2013.01); *B60Q 2300/146* (2013.01); *B60Q 2300/324* (2013.01)
(58) Field of Classification Search
CPC ............. B60Q 1/115; B60Q 2300/112; B60Q 2300/132; B60Q 2300/146; B60Q 2300/324
USPC ......................................................... 701/49
See application file for complete search history.

(56) References Cited

U.S. PATENT DOCUMENTS

| 8,820,986 | B2 | 9/2014 | Yamazaki et al. | |
|---|---|---|---|---|
| 8,858,046 | B2 | 10/2014 | Yamazaki et al. | |
| 2011/0317439 | A1 | 12/2011 | Yamazaki et al. | |
| 2012/0002430 | A1 | 1/2012 | Yamazaki et al. | |
| 2012/0268958 | A1* | 10/2012 | Kasaba ..................... | B60Q 1/10 362/466 |
| 2012/0303223 | A1* | 11/2012 | Kasaba ..................... | B60Q 1/10 701/49 |

FOREIGN PATENT DOCUMENTS

| JP | 2012-030782 A | 2/2012 |
|---|---|---|
| JP | 2012-030783 A | 2/2012 |

* cited by examiner

*Primary Examiner* — Fadey Jabr
*Assistant Examiner* — Aaron L Troost
(74) *Attorney, Agent, or Firm* — Osha Liang LLP (57) ABSTRACT

In a vehicle lamp control device, a control unit is configured to a) hold a road surface angle reference value and a vehicle posture angle reference value in a volatile manner, b) generate an optical axis adjusting signal using a vehicle posture angle in response to variation in a total angle during the stop of the vehicle, c) avoid generating or outputting the optical axis adjusting signal or output an optical axis holding signal, and hold a road surface angle as a new reference value, in response to variation in the total angle during travelling of the vehicle. The control unit, in response to receiving the turn-off signal of the switch, d-1) writes at least the road surface angle reference value in the storage unit or continues to execute the step (c) while delaying the step (d-1).

5 Claims, 6 Drawing Sheets

VEHICLE LAMP CONTROL DEVICE

CROSS-REFERENCE TO RELATED APPLICATION

This application claims priority from Japanese Patent Application No. 2013-239781, filed on Nov. 20, 2013, the entire contents of which are hereby incorporated by reference.

BACKGROUND

1. Technical Field

The present invention relates to a vehicle lamp control device. More particularly, the present invention relates to a vehicle lamp control device used in automobiles or the like.

2. Description of the Related Art

Conventionally, there is known an auto-leveling control which automatically adjusts a position of an optical axis of a vehicle headlamp according to an inclination angle of a vehicle and changes an irradiation direction of the headlamp. Generally, in the auto-leveling control, a position of an optical axis of a headlamp is adjusted on the basis of a pitch angle of a vehicle derived from an output value of a vehicle height sensor. On the contrary, JP-A-2012-030782 and JP-A-2012-030783 disclose a vehicle lamp control device in which an auto-leveling control is performed using an inclination sensor such as an acceleration sensor.

In the case of using an inclination sensor such as an acceleration sensor, a gyro sensor (an angular velocity sensor and an angular acceleration sensor) and a geomagnetic sensor, an auto-leveling system can be made in a less expensive manner and it is possible to reduce the weight of the auto-leveling system, as compared with the case of using a vehicle height sensor. As a result, it is possible to reduce the weight and cost of a vehicle. On the other hand, even in the case of using the inclination sensor such as the acceleration sensor, there is a demand to execute the auto-leveling control with high accuracy.

The present inventors have intensively studied in order to achieve the high accuracy of an auto-leveling control. As a result, the present inventors have recognized that there is room for improvements in terms of the higher accuracy of the auto-leveling control in a conventional vehicle lamp control device.

SUMMARY OF THE INVENTION

One of aspects of the present invention is to provide a technology that is capable of improving the accuracy of an auto-leveling control of a vehicle lamp.

According to one or more aspects of the present invention, there is provided a vehicle lamp control device comprising:

a receiver configured to receive an output value of an inclination sensor, an output value of a vehicle speed sensor and a signal indicating turn-on/off of a switch of a power supply configured to supply power to the control device, wherein the inclination sensor is configured to derive a total angle including a road surface angle and a vehicle posture angle, and the total angle is an inclination angle of a vehicle to a horizontal plane, the road surface angle is an inclination angle of a road surface to the horizontal plane and the vehicle posture angle is an inclination angle of the vehicle to the road surface;

a control unit configured to control an optical axis of a vehicle lamp; and a storage unit configured to store a road surface angle reference value and a vehicle posture angle reference value in a non-volatile manner, The control unit is configured to: a) hold the road surface angle reference value and the vehicle posture angle reference value in a volatile manner, b) generate an optical axis adjusting signal using the vehicle posture angle, which is obtained from the total angle and the held road surface angle reference value and hold the obtained vehicle posture angle as a new reference value, in response to variation in the total angle during the stop of the vehicle; c) avoid generating or outputting the optical axis adjusting signal or output an optical axis holding signal, and hold the road surface angle, which is obtained from the total angle and the held vehicle posture angle reference value, as a new reference value, in response to variation in the total angle during travelling of the vehicle; and d) in response to receiving the turn-off signal of the switch, d-1) if the output value of the vehicle speed sensor received before the turn-off of the switch is a value indicating the stop of the vehicle, write at least the road surface angle reference value of the held road surface angle reference value and the held vehicle posture angle reference value in the storage unit, d-2) if the received output value of the vehicle speed sensor is a value indicating the travel of the vehicle or a value indicating abnormality of the vehicle speed sensor or if the output value of the vehicle speed sensor is not received at least within a predetermined time before receiving the turn-off signal, continue to execute the step (c) while delaying the step (d-1). According to this aspect, it is possible to improve the accuracy of the auto-leveling control of the vehicle lamp.

According to one or more aspects of the present invention, in response to receiving the turn-off signal of the switch, the control unit is further configured to determine whether to execute or delay the step (d-1) based on the output value of the inclination sensor, if the received output value of the vehicle speed sensor is a value indicating the travel of the vehicle or a value indicating abnormality of the vehicle speed sensor or if the output value of the vehicle speed sensor is not received at least within a predetermined time before receiving the turn-off signal.

The control unit is further configured to execute the step (d-1) if variation per unit time of the output value of the inclination sensor is a threshold or less.

According to these aspects, it is possible to improve the accuracy of the auto-leveling control of the vehicle lamp.

According to one or more aspects of the present invention, in response to receiving the turn-off signal of the switch, the control unit is further configured to:

write, in the storage unit, abnormality information indicating abnormality of the vehicle speed sensor, if the received output value of the vehicle speed sensor is a value indicating abnormality of the vehicle speed sensor or if the output value of the vehicle speed sensor is not received at least within a predetermined time before receiving the turn-off signal, and output the abnormality information in response to receiving the turn-on signal of the switch or in response to a request from an external device.

According to this aspect, it is possible to notify abnormality of a vehicle to a driver or a repair person.

According to one or more aspects of the present invention, the control unit is further configured to maintain the supply of power from the power supply in the turn-off state of the switch. According to this aspect, it is possible to more reliably execute a non-volatile storage of a reference value after switching off.

A proper combination of respective parts described above can be also included in the scope of the invention to be protected by the present patent application.

According to the present invention, it is possible to provide a technology that is capable of improving the accuracy of an auto-leveling control of a vehicle lamp.

DETAILED DESCRIPTION

Hereinafter, a preferred embodiment of the present invention will be described with reference to the drawings. The same or similar elements, members and process shown in each of the drawings are denoted by the same or similar reference numerals and a duplicated description thereof will be properly omitted. Further, the embodiment is illustrative and not intended to limit the present invention. It should be noted that all the features and their combinations described in the embodiment are not necessarily considered as an essential part of the present invention.

Figure 1:
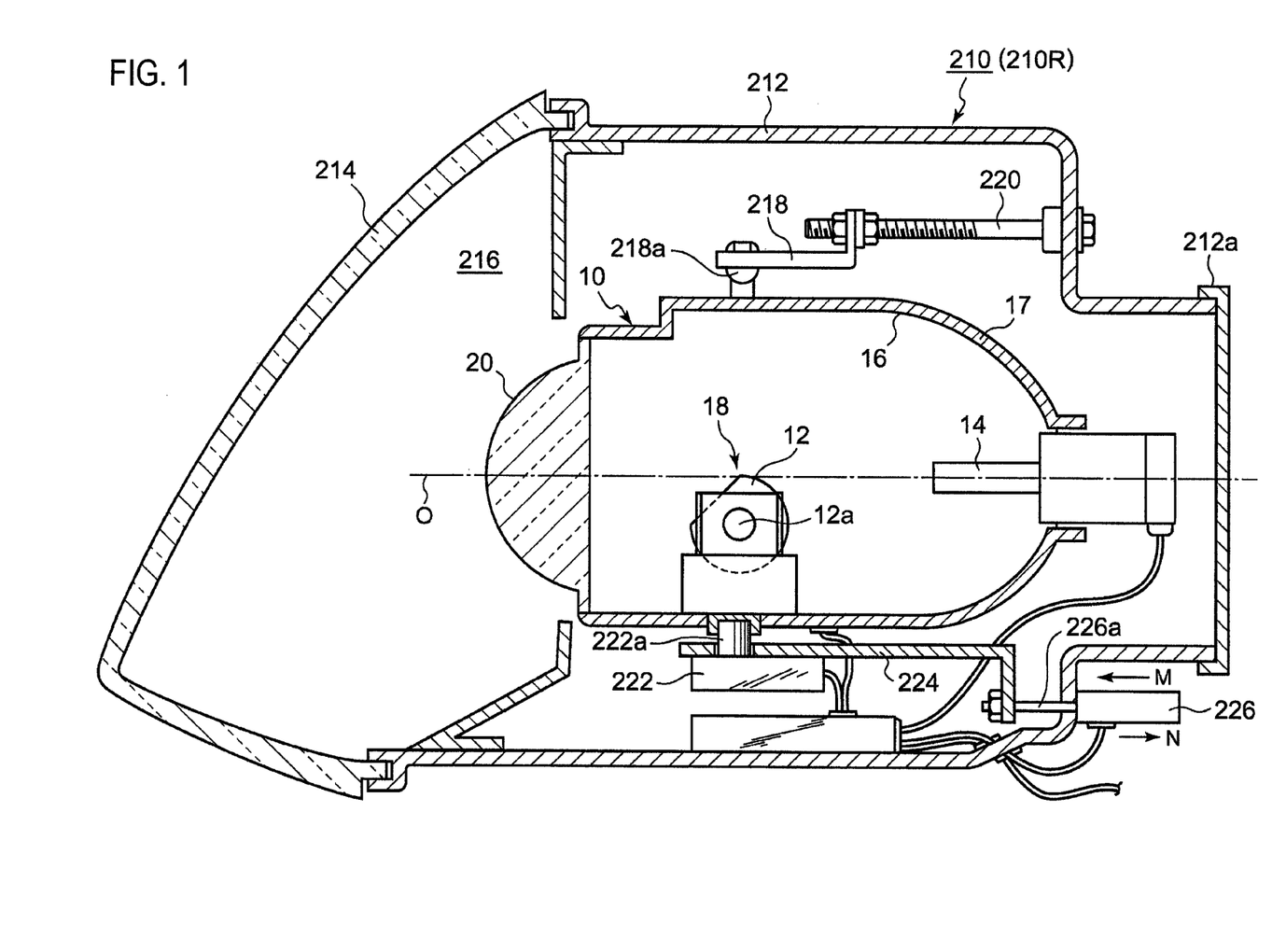
FIG. 1 is a schematic vertical sectional view of a headlamp unit including a vehicle lamp that is to be controlled by a control ECU according to an illustrative embodiment.

FIG. 1 is a schematic vertical sectional view of a headlamp unit 210 including a vehicle lamp that is an object to be controlled by a control ECU according to an illustrative embodiment. The headlamp unit 210 has a structure in which each of a pair of headlamp units formed in bilateral symmetry is arranged on the left and right sides in a vehicle width direction of a vehicle. A right headlamp unit 210R and a left headlamp unit 210L have substantially the same structure. Accordingly, in the following, a structure of the right headlamp unit 210R will be described. The right headlamp unit 210R includes a lamp body 212 having an opening on the front side of a vehicle and a translucent cover 214 to cover the opening. The lamp body 212 includes a removable cover 212a on the rear side of the vehicle. A lamp chamber 216 is formed by the lamp body 212 and the translucent cover 214. A lamp unit 10 as a vehicle lamp is accommodated in the lamp chamber 216.

The lamp unit 10 is formed with a lamp bracket 218 having a pivot mechanism 218a that is a pivot center in the vertical direction of the lamp unit 10. The lamp bracket 218 is screwed with an aiming adjustment screw 220 which is supported by the lamp body 212. A rotation shaft 222a of a swivel actuator 222 is fixed to a lower surface of the lamp unit 10. The swivel actuator 222 is fixed to a unit bracket 224. A leveling actuator 226 is connected to the unit bracket 224. The leveling actuator 226 is configured by, e.g., a motor or the like to extend and retract a rod 226a in directions of arrows M, N. The lamp unit 10 has a rearward tilted posture or a forward tilted posture according to the extension and retraction in the directions of arrows M, N of the rod 226a. Thereby, it is possible to execute a leveling adjustment which directs a pitch angle of an optical axis O upward or downward.

The lamp unit 10 includes a shade mechanism 18 having a rotation shade 12, a light source 14, a lamp housing 17 to support a reflector 16 on an inner wall thereof and a projection lens 20. As the light source 14, an incandescent bulb, a halogen lamp, a discharge bulb, an LED or the like can be used. At least a portion of the reflector 16 has an ellipse spherical shape. The reflector 16 is adapted to reflect the light emitted from the light source 14. The light emitted from the light source 14 and light reflected by the reflector 16 are partially directed to the projection lens 20 via the rotation shade L. The rotation shade 12 is a cylindrical member rotatable about a rotation shaft 12a and includes a cutout portion and a plurality of shade plates (not shown). One of the shade plates or the cutout portion moves on the optical axis O, thereby forming a predetermined light distribution pattern. The projection lens 20 is configured by a plano-convex aspheric lens. The projection lens 20 projects a light source image formed on a rear focal plane thereof, as an inverted image, on a virtual vertical screen ahead of the lamp.

Figure 2:
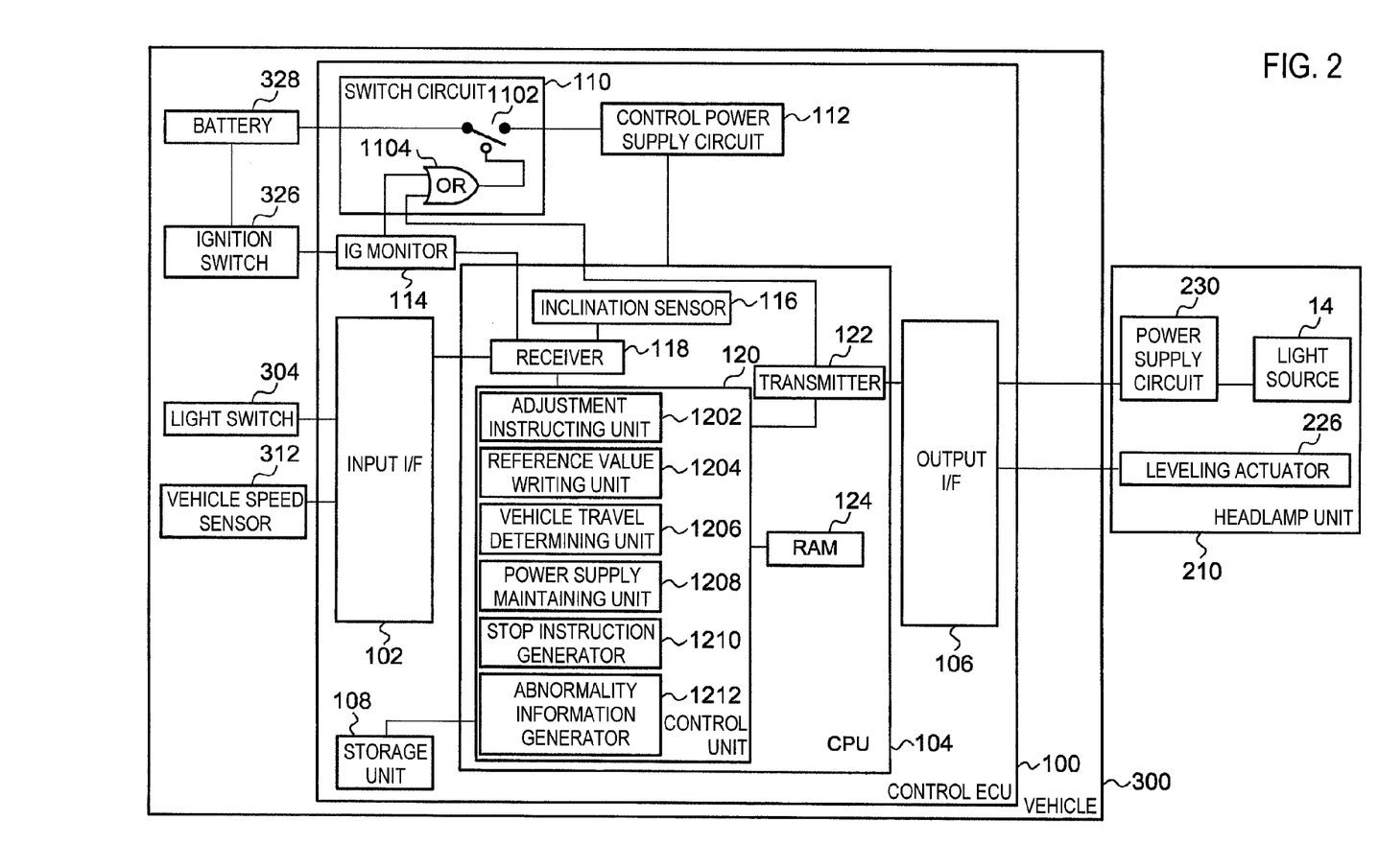
FIG. 2 is a functional block diagram for explaining an operational linkage of the headlamp unit and the control ECU.

FIG. 2 is a functional block diagram for explaining an operational linkage of the headlamp unit and the control ECU. In FIG. 2, the right headlamp unit 210R and the left headlamp unit 210L are collectively shown as the headlamp unit 210. Further, a control ECU 100 has a hardware configuration that is realized by circuits and elements including a memory and CPU of a computer and a software configuration that is realized by a computer program or the like. However, in FIG. 2, the control ECU 100 is properly indicated as functional blocks which are realized by the cooperation of the hardware configuration and the software configuration. It will be obvious to those skilled in the art that these functional blocks can be realized in various forms by combinations of hardware and software.

The control ECU 100 as a vehicle lamp control device includes an input interface 102, a CPU 104, an output interface 106, a storage unit 108, a switch circuit 110, a control power supply circuit 112 and an IG monitor 114. For example, the control ECU 100 is installed in the vicinity of a dashboard of a vehicle 300. An installation position of the control ECU 100 is not particularly limited. For example, the control ECU 100 may be provided in the headlamp unit 210.

The input interface 102 is connected to a light switch 304 and a vehicle speed sensor 312 or the like. Signals outputted from the light switch 304 and the vehicle speed sensor 312 are inputted to the control ECU 100 through the input interface 102. The inputted signals are transmitted to the CPU 104 from the input interface 102.

The CPU 104 includes an inclination sensor 116, a receiver 118, a control unit 120, a transmitter 122 and a RAM 124.

The receiver 118 receives various signals inputted to the control ECU 100 through the input interface 102. The signal also includes an output value of the vehicle speed sensor 312. Further, the receiver 118 receives a signal outputted from the IG monitor 114 and the inclination sensor 116. The signal received by the receiver 118 is transmitted to the control unit 120. The control unit 120 controls the optical axis O of the lamp unit 10 using the output value of the inclination sensor 116. The control unit 120 includes an adjustment instructing unit 1202, a reference value writing unit 1204, a vehicle travel determining unit 1206, a power supply maintaining unit 1208, a stop instruction signal generator 1210 and an abnormality information generator 1212.

The control unit 120 generates pitch angle information of the vehicle 300 using the output value of the inclination sensor 116 and, as necessary, information stored in the RAM 124 or the storage unit 108. Then, the control unit 120 generates an optical axis adjusting signal to instruct the adjustment of the optical axis O by using the obtained pitch angle information. Further, the control unit 120 generates a control signal to instruct the turning on/off of the lamp unit 10, or a control signal to instruct the switching of the switch circuit 110, etc. Operation of each unit included in the control unit 120 will be described in detail later.

The RAM 124 is a volatile memory for temporarily storing the information used in the control executed by the control unit 120. The RAM 124 temporarily stores information transmitted from the control unit 120 and information called from the storage unit 108. The control unit 120 holds a road surface angle reference value and a vehicle posture angle reference value (to be described later) in a volatile manner using the RAM 124. Further, the output values of the vehicle speed sensor 312 are repeatedly sent to the control ECU 100 in a predetermined timing and stored in the RAM 124. A power supply of the vehicle speed sensor 312 is a so-called ignition power supply. The vehicle speed sensor 312 is adapted to output a detected value when an ignition switch 326 is turned on and to stop outputting the detected value when the ignition switch 326 is turned off. The storage unit 108 is a non-volatile memory for storing, in a non-volatile manner, various information including the road surface angle reference value and vehicle posture angle reference value.

Upon receiving various signals from the control unit 120, the transmitter 122 transmits the received signals to the output interface 106. Further, the transmitter 122 transmits a switching signal to instruct the switching of the switch circuit 110 to the switch circuit 110. The output interface 106 is connected to a power supply circuit 230 and a leveling actuator 226 of the headlamp unit 210.

The optical axis adjusting signal or turning on/off instructing signal generated by the control unit 120 is outputted to the power supply circuit 230 or the leveling actuator 226 of the headlamp unit 210 through the output interface 106. The leveling actuator 226 is driven by receiving the optical axis adjusting signal, so that the optical axis O of the lamp unit 10 is adjusted for the pitch angle orientation. Further, the power supply circuit 230 executes the turn on/off of the light source 14 based on the turning on/off instructing signal received.

A battery 328 and the ignition switch 326 are mounted on a vehicle. With the turn on/off of the ignition switch 326, the supply or non-supply of power from the battery 328 to the control ECU 100 can be switched. Namely, the ignition switch 326 functions as a switch of a power supply for supplying power to the control ECU 100. The switch circuit 110 connects the battery 328 and the control power supply circuit 112 to each other. The switch circuit 110 includes a switch 1102 and an OR circuit 1104. Upon receiving, from the OR circuit 1104, a switch switching instruction signal (hereinafter, suitably referred to as "High level signal") which is set to High level, the switch 1102 is turned on. Upon receiving, from the OR circuit 1104, a switch switching instruction signal (hereinafter, suitably referred to as "Low level signal") which is set to Low level, the switch 1102 is turned off. Signal from the IG monitor 114 or the CPU 104 is inputted from the OR circuit 1104.

The IG monitor 114 monitors the turn on/off state of the ignition switch 326. When the ignition switch 326 is turned on, the IG monitor 114 transmits High level signal (signal indicating the turn on of the ignition switch 326) to the receiver 118 and the OR circuit 1104. Further, when the ignition switch 326 is turned off, the IG monitor 114 transmits Low level signal (signal indicating the turn off of the ignition switch 326; off signal) to the receiver 118 and the OR circuit 1104. The IG monitor 114 can monitor the turn on/off of the ignition switch 326 by receiving the signal indicating the on state or off state from the ignition switch 326, for example. Alternatively, the IG monitor 114 can monitor the turn on/off of the ignition switch 326 by monitoring ignition voltage. In this case, the IG monitor 114 determines the turn off of the ignition switch 326, for example, when the ignition voltage falls below a threshold or the ignition voltage is 0 V.

When the High level signal is transmitted to the switch 1102 through the OR circuit 1104 from the IG monitor 114 in a state where the ignition switch 326 is turned on, the switch 1102 is turned on and the battery 328 and the control power supply circuit 112 are connected to each other. In this way, power is supplied to the control power supply circuit 112 from the battery 328. Alternatively, when the High level signal is transmitted to the switch 1102 through the OR circuit 1104 from the control unit 120 by the control described later, similarly, the switch 1102 is turned on and power is supplied to the control power supply circuit 112 from the battery 328. The control power supply circuit 112 supplies the CPU 104 with the power supplied from the battery 328. When the Low level signal is transmitted to the switch 1102 from the IG monitor 114 and the control unit 120, the switch 1102 is turned off and connection between the battery 328 and the control power supply circuit 112 is released. In this way, supply of power from the battery 328 to the CPU 104 is stopped.

The control ECU 100 determines the light distribution pattern to be formed by the headlamp unit 210, depending on the operation content of the light switch 304 by a driver. Further, the control ECU 100 may be automatically controlled so as to form a light distribution pattern optimal to a state of a vehicle detected by various sensors, irrespective of the operation of the light switch 304. The automatic control of formation of the light distribution pattern is executed when the automatic control of formation of the light distribution pattern is instructed by the light switch 304, for example.

Figure 3:
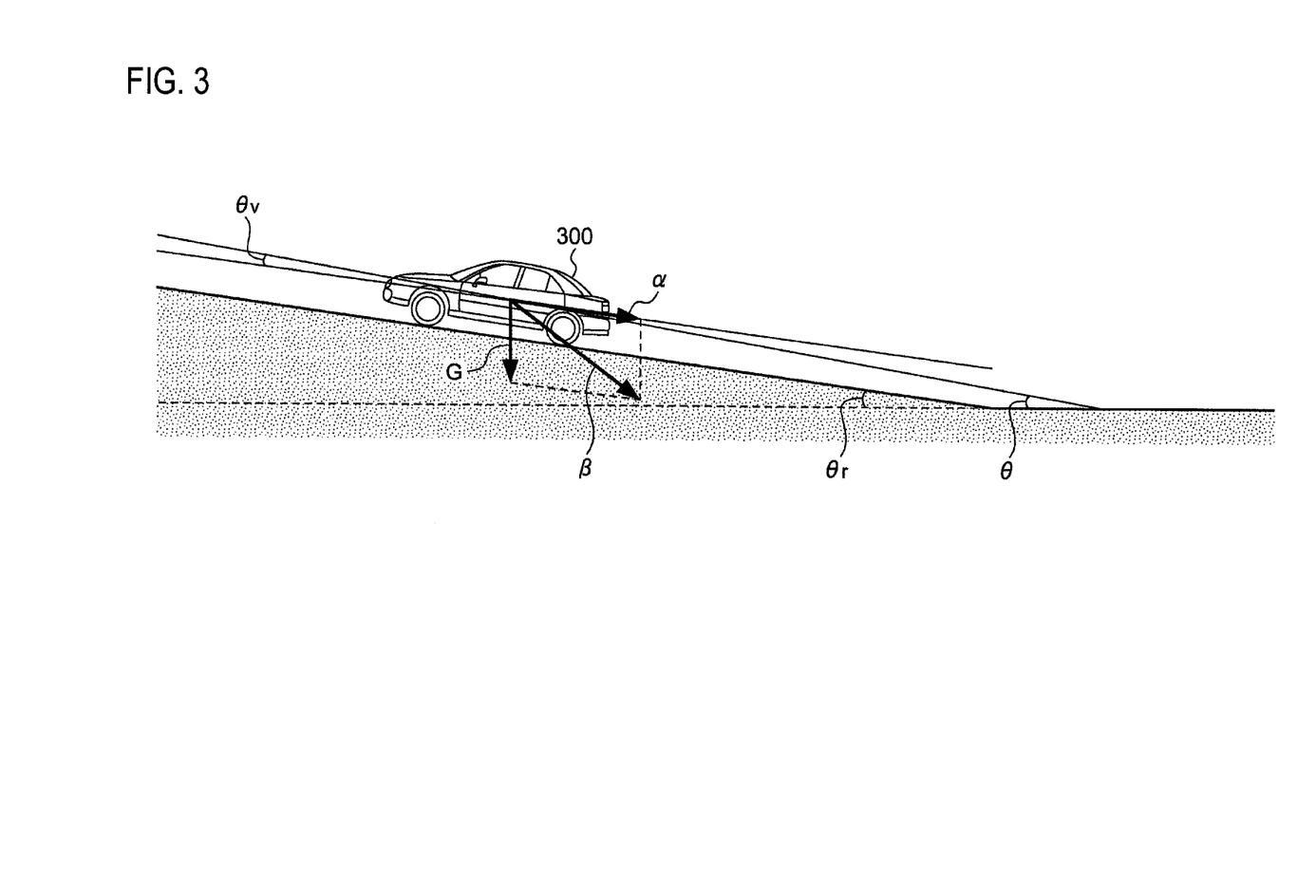
FIG. 3 is a schematic view for explaining an acceleration vector that occurs in a vehicle and an inclination angle of a vehicle that can be detected by an inclination sensor.

Subsequently, an auto-leveling control by the control ECU 100 having the above-described configurations will be described in detail. FIG. 3 is a schematic view for explaining an acceleration vector that occurs in a vehicle and an inclination angle of a vehicle that can be detected by the inclination sensor.

For example, when luggage is placed on a luggage room in a rear portion of a vehicle or a passenger exists at a rear seat, the vehicle has a rearward tilted posture. When luggage is unloaded from a luggage room or a passenger in a rear seat gets off, the posture of the vehicle changes from the state of the rearward tilted posture to the state of a forward tilted posture. When the vehicle has the rearward tilted posture or the forward tilted posture, the irradiation direction of the lamp unit 10 also fluctuates up and down and therefore the forward irradiation distance becomes longer or shorter. Accordingly, the control ECU 100 derives an inclination angle in a pitch direction of a vehicle or variation thereof from the output value of the inclination sensor 116 and causes a pitch angle (hereinafter, suitably referred to as "optical axis angle θo") of the optical axis O to have an angle corresponding to the posture of the vehicle. By carrying out an auto-leveling control where the leveling adjustment of the lamp unit 10 is executed in real time on the basis of the posture of the vehicle, it is possible to optimally adjust the reachable distance of the forward irradiation even when the posture of the vehicle changes.

In the present embodiment, the inclination sensor 116 is configured by an acceleration sensor. For example, the inclination sensor 116 is a three-axis acceleration sensor having X axis, Y axis and Z axis, which are orthogonal to each other. The inclination sensor 116 is mounted to the vehicle 300 at an arbitrary posture and detects an acceleration vector occurring in the vehicle 300. Motion acceleration due to the movement of the vehicle 300 and gravitational acceleration occur in the vehicle 300 during travelling. Therefore, the inclination sensor 116 can detect a synthesized acceleration vector β of a gravitational acceleration vector G and a motion acceleration vector α, as shown in FIG. 3. Further, the inclination sensor 116 can detect the gravitational acceleration vector G while the vehicle 300 is stopped. The inclination sensor 116 outputs numerical values of each axis component of the detected acceleration vector. Numerical values of each of X axis component, Y axis component and Z axis component outputted from the inclination sensor 116 are converted into the longitudinal axis component, horizontal axis component and vertical axis component of the vehicle 300 by the CPU 104. Accordingly, it is possible to derive the longitudinal acceleration, horizontal acceleration and vertical acceleration of the vehicle from the output values of the inclination sensor 116.

From the detected values of the inclination sensor 116 during the stop of the vehicle, inclination of the vehicle 300 relative to the gravitational acceleration vector G can be derived. Namely, from the output values of the inclination sensor 116, it is possible to derive a total angle θ including a road surface angle θr and a vehicle posture angle θv. Here, the road surface angle θr is an inclination angle of a road surface to the horizontal plane, the vehicle posture angle θv is an inclination angle of the vehicle to the road surface and the total angle θ is an inclination angle of the vehicle to the horizontal plane. The road surface angle θr, the vehicle posture angle θv and the total angle θ are angles in the pitch direction of the vehicle 300.

On the other hand, an object of the auto-leveling control is to optimally maintain the forward reaching distance of the irradiation light by absorbing variation in the forward irradiation distance of the vehicle lamp according to variation in the inclination angle in the pitch direction of the vehicle. Accordingly, an inclination angle of the vehicle that is required for the auto-leveling control is the vehicle posture angle θv. Namely, in the auto-leveling control, it is desired that the position of the optical axis of the lamp unit 10 is adjusted when the vehicle posture angle θv is varied and the position of the optical axis of the lamp unit 10 is maintained when the road surface angle θr is varied.

Accordingly, the control ECU 100 of the present embodiment estimates variation in the total angle θ during the stop of the vehicle as variation in the vehicle posture angle θv and estimates variation in the total angle θ during travelling of the vehicle as variation in the road surface angle θr. During travelling of the vehicle, there is almost no case that the number of passengers or the amount of loading luggage increases or decreases and therefore the vehicle posture angle θv is varied. Accordingly, it is possible to estimate the variation in the total angle θ during travelling of the vehicle as the variation in the road surface angle θr. On the other hand, during the stop of the vehicle, there is almost no case that the vehicle 300 moves and therefore the road surface angle θr is varied. Accordingly, it is possible to estimate the variation in the total angle θ during the stop of the vehicle as the variation in the vehicle posture angle θv.

Then, the adjustment instructing unit 1202 of the control ECU 100 executes the adjustment of the optical axis with respect to the variation in the total angle θ during the stop of the vehicle and avoids the adjustment of the optical axis with respect to the variation in the total angle θ during travelling of the vehicle. The adjustment instructing unit 1202 can avoid the adjustment of the optical axis by avoiding the generation or output of an optical axis adjusting signal or outputting an optical axis holing signal to instruct the holding of the optical axis.

Specifically, first, in a manufacturing plant or the like of a vehicle manufacturer, a reference state where the vehicle 300 is placed on a horizontal plane is obtained. Then, an initializing signal is transmitted to the control ECU 100 by switch operation of an initialization processing device or communication of a CAN (Controller Area Network) system, or the like. Upon receiving the initializing signal, the control unit 120 starts an initial aiming adjustment and adjusts the optical axis O of the lamp unit 10 to an initial setting position. Further, the control unit 120 holds the output value of the inclination sensor 116 in the reference state by storing the output value as a road surface angle reference value (θr=0°) and a vehicle posture angle reference value (θv=0°) in the RAM 124. Further, the control unit 120 writes these reference values in the storage unit 108, as necessary.

(Control while Ignition Switch is Turned on)

In a situation where the vehicle 300 is actually used, the adjustment instructing unit 1202 of the control unit 120 executes a processing during vehicle travel indicated below while the vehicle travels. Namely, in the processing during vehicle travel, the adjustment instructing unit 1202 avoids the adjustment of the optical axis with respect to variation in the total angle θ during travelling of the vehicle. Further, when the vehicle is stopped, the adjustment instructing unit 1202 holds, as a new reference value, the road surface angle θr which is obtained from the total angle θ and the vehicle posture angle reference value held therein. Specifically, the adjustment instructing unit 1202 obtains the road surface angle θr by subtracting the vehicle posture angle reference value stored in the RAM 124 from the current total angle θ. Then, as a new reference value, the obtained road surface angle θr is stored in the RAM 124. In this way, the variation in the total angle θ during travelling of the vehicle, which is estimated as the variation in the road surface angle θr, is incorporated into a road surface angle reference value. The adjustment instructing unit 1202 may calculate a new road surface angle reference value by calculating difference in the total angle θ before and after travelling when the vehicle is stopped and then including the difference in the road surface angle reference value. Further, the adjustment instructing unit 1202 may repeatedly update the road surface angle reference value in a predetermined timing during travelling of the vehicle, instead of or in addition to when the vehicle is stopped.

While the vehicle is stopped, the adjustment instructing unit 1202 executes a processing during vehicle stop indicated below. Namely, in the processing during vehicle stop, the adjustment instructing unit 1202 repeatedly calculates the vehicle posture angle θv in a predetermined timing. The adjustment instructing unit 1202 generates an optical axis adjusting signal using the total angle θ and the vehicle posture angle θv obtained from the road surface angle reference value held therein, with respect to variation in the total angle θ during the stop of the vehicle and holds the obtained vehicle posture angle θv as a new reference value.

Specifically, the adjustment instructing unit 1202 obtains the vehicle posture angle θv by subtracting the road surface angle reference value stored in the RAM 124 from the current total angle θ. Then, as a new reference value, the obtained vehicle posture angle θv is stored in the RAM 124. In this way, the variation in the total angle θ during the stop of the vehicle, which is estimated as the variation in the vehicle posture angle θv, is incorporated into a vehicle posture angle reference value. The adjustment instructing unit 1202 may calculate a new vehicle posture angle reference value by, e.g., calculating difference between the total angle θ previously detected and the current total angle θ and then including the difference in the vehicle posture angle reference value. Then, the adjustment instructing unit 1202 generates an optical axis adjusting signal using the obtained vehicle posture angle θv or the updated vehicle posture angle reference value. For example, the adjustment instructing unit 1202 determines an optical axis angle θo using a conversion table where the vehicle posture angle θv stored, in advance, in the storage unit 108 is associated with the optical axis angle θo. The generated optical axis adjusting signal is transmitted to the leveling actuator 226 from the transmitter 122, so that the optical axis O is adjusted to the determined optical axis angle θo by the driving of the leveling actuator 226.

It can be determined from a vehicle speed obtained by, e.g., the vehicle speed sensor 312 whether the vehicle is travelling or stopped. For example, the "during travelling of the vehicle" refers to a time period from the time when the detection value of the vehicle speed sensor 312 exceeds zero to the time when the detection value of the vehicle speed sensor 312 becomes zero. For example, the "when the vehicle is stopped" refers to the time when the output value of the inclination sensor 116 is stabilized after the detection value of the vehicle speed sensor 312 becomes zero. Here, the "stabilized time" may refer to the time when variation per unit time of the output value of the inclination sensor 116 is equal to or less than a predetermined amount or the time when a predetermined time (e.g., one to two seconds) has lapsed from the time when the detected value of the vehicle speed sensor 312 becomes zero. For example, the "during the stop of the vehicle" refers to a time period from the time when the output value of the inclination sensor 116 is stabilized (when the vehicle is stopped) to the time when the output value of the vehicle speed sensor 312 exceeds zero. The "during travelling of the vehicle," "when the vehicle is stopped," "predetermined amount," "predetermined time" and "during the stop of the vehicle" can be properly set on the basis of an experiment or simulation by a planner.

(Control when Ignition Switch is Shifted to Turn-Off State)

The control unit 120 is driven by the power supplied from the battery 328. Therefore, when the ignition switch 326 is turned off and therefore the supply of power from the battery 328 is stopped, the road surface angle reference value and the vehicle posture angle reference value, which are stored in the RAM 124, are erased. For this reason, when the ignition switch 326 is shifted to a turn-off state, the reference value writing unit 1204 executes a reference value storage processing where the road surface angle reference value and the vehicle posture angle reference value, which are stored in the RAM 124, are written in the storage unit 108 that is a non-volatile memory. In this way, the control ECU 100 can hold the reference values of the vehicle posture angle θv and the road surface angle θr even when the ignition switch 326 is turned off and the supply of power from the battery 328 is stopped.

Figure 4A:
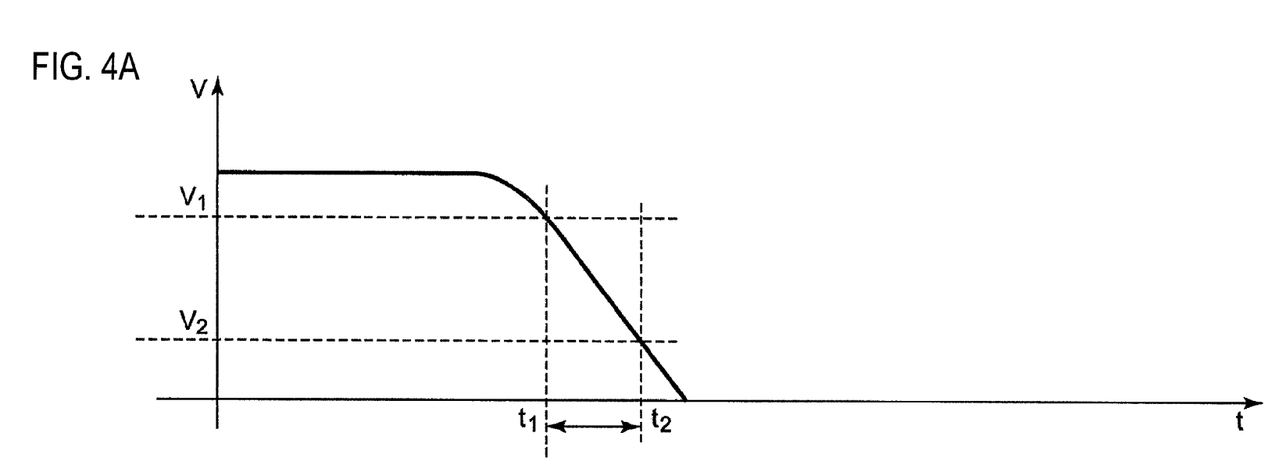
FIG. 4A is a time chart showing the time variation of supply power in a control ECU according to a comparative example.
Figure 4B:
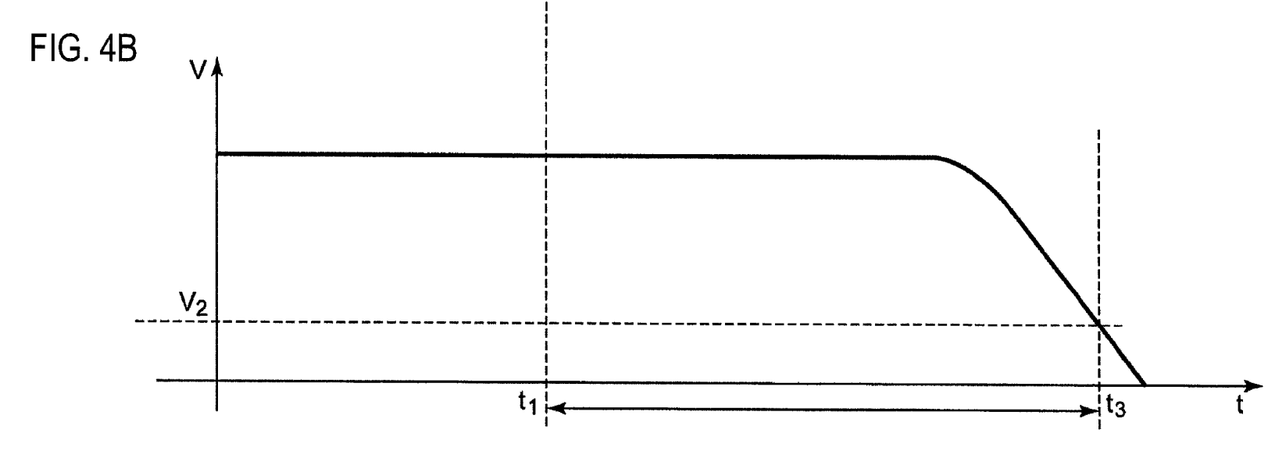
FIG. 4B is a time chart showing the time variation of supply power in the control ECU according to the illustrative embodiment.

Now, a method of supplying the power required for the operation of the reference value writing unit 1204 will be described. FIG. 4A is a time chart showing the time variation of supply power in a control ECU according to a comparative example. FIG. 4B is a time chart showing the time variation of supply power in the control ECU according to the illustrative embodiment. In FIG. 4A and FIG. 4B, the vertical axis indicates the power supply voltage (V) and the horizontal axis indicates the time (t).

As described above, the reference value writing unit 1204 writes the road surface angle reference value and the vehicle posture angle reference value in the storage unit 108 after the turn-off state of the ignition switch 326 is detected. Meanwhile, when the ignition switch 326 is turned off, the turn-on state of the switch 1102 held by the High level signal from the IG monitor 114 is released. Therefore, the supply of power from the battery 328 to the control unit 120 is stopped and the writing operation of the reference value writing unit 1204 is also stopped. Accordingly, it is necessary to secure the power required for the writing operation of the reference value writing unit 1204 from the time when the turn-off state of the ignition switch 326 is detected to the time when the writing operation of the reference value writing unit 1204 is ended.

It is conceivable that the power is obtained by the power supplied from the battery 328 from the time when, for example, the ignition switch 326 is turned off to the time when the switch 1102 is turned off and thus the supply of power from the battery 328 is stopped and the power supplied from an electricity storage element (not shown) such as a capacitor provided around the battery 328 or in the control EUC 100. Referring to a comparative example where the power required for the operation of the reference value writing unit 1204 is ensured in this way, the supply of power in the control ECU of the comparative example is varied as shown in FIG. 4A.

Specifically, it is assumed that the turn-off state of the ignition switch 326 is detected at time $t_1$ and the voltage when the turn-off state of the ignition switch 326 is detected is defined as V1. Power supply voltage gradually decreases from the voltage V1 and reaches a drive lower-limit voltage V2 of the reference value writing unit 1204 at time $t_2$. Accordingly, it is necessary that the reference value writing unit 1204 completes an operation to write the road surface angle reference value and the vehicle posture angle reference value during the time period from time $t_1$ to time $t_2$. Reduction rate (slope of straight line) of the power supply voltage from time $t_1$, i.e., a length from time $t_1$ to time $t_2$ depends on the system load of the CPU 104 or the like and the time constant of the electricity storage element, etc.

Accordingly, in the control ECU of the comparative example, there is a possibility that the power required for the reference value writing unit 1204 cannot be supplied until the wring operation of the reference value writing unit 1204 is completed. The control ECU of the comparative example is configured to be driven by the power supplied from the ignition power supply. Accordingly, the power supply voltage in the vertical axis of FIG. 4A is equal to the ignition voltage. Further, the control ECU detects the turn-off state of the ignition switch 326 when the ignition voltage falls below a threshold voltage (in this example, when the value of the ignition voltage is V1).

Therefore, the control ECU 100 according to the present embodiment secures the power required for the writing operation of the reference value writing unit 1204 in the following manner. Namely, in the control ECU 100, the power supply maintaining unit 1208 of the control unit 120 maintains the supply of power from the battery 328 (power supply) in a state where the ignition switch 326 is turned off. Specifically, when the ignition switch 326 is turned on and the High level signal is transmitted from the IG monitor 114, the power supply maintaining unit 1208 transmits the High level signal to the OR circuit 1104 through the transmitter 122. Further, the power supply maintaining unit 1208 continues to transmit the High level signal even when the ignition switch 326 is turned off. In this way, the supply power in the control ECU 100 of the present embodiment is varied as shown in FIG. 4B.

Namely, the turn-on state of the switch 1102 is maintained by the power supply maintaining unit 1208 even after the ignition switch 326 is turned off. Accordingly, a length from time t1 when the turn-off state of the ignition switch 326 is detected to time t3 when the power supply voltage reaches the drive lower-limit voltage V2 of the reference value writing unit 1204 can adjusted to match the time required for the reference value writing processing. Therefore, the reference value writing unit 1204 can more reliably write the road surface angle reference value and the vehicle posture angle reference value in the storage unit 108.

The power supply maintaining unit 1208 may transmit the High level signal when the ignition switch 326 is turned off and the Low level signal is received from the IG monitor 114, instead of transmitting the High level signal when the ignition switch 326 is turned on. Also in this case, it is possible to maintain the turn-on state of the switch 1102 after the ignition switch 326 is turned off. From the viewpoint of stabilization of the power supply to the control unit 120, it is preferable that the power supply maintaining unit 1208 transmits the High level signal along with the turn-on of the ignition switch 326.

When the road surface angle reference value and the vehicle posture angle reference value, which are stored in the RAM 124, are completely written in the storage unit 108, the reference value writing unit 1204 transmits a writing completion signal to indicate the writing completion of the reference values to the stop instruction signal generator 1210. Upon receiving the writing completion signal, the stop instruction signal generator 1210 generates a stop instruction signal to instruct the stop of the power supply from the battery 328 and transmits the stop instruction signal to the power supply maintaining unit 1208. Upon receiving the stop instruction signal, the power supply maintaining unit 1208 switches the signal transmitted to the OR circuit 1104 from the High level to the Low level. In this way, since the Low level signal is transmitted to the OR circuit 1104 from the IG monitor 114 and the CPU 104, the switch 1102 is shifted to the turn-off state. As a result, the supply of power from the battery 328 to the control unit 120 is stopped. In this way, the power supply maintaining unit 1208 stops the supply of power from the battery 328 by receiving the stop instruction signal, so that it is possible to suppress an increase in power consumption.

The above-described reference value storage processing is executed assuming that the vehicle 300 is stopped when the ignition switch 326 is shifted to the turn-off state. However, in a situation where the vehicle 300 is actually used, there is a possibility that the ignition switch 326 is turned off during travelling of the vehicle. Namely, a situation where the vehicle 300 is travelling even when the ignition switch 326 is shifted to the turn-off state may occur. In this case, there is a possibility that the road surface angle θr is varied after the ignition switch 326 is shifted to the turn-off state. Accordingly, when the reference value storage processing is executed by the shifting of the ignition switch 326 into the turn-off state, there is a possibility that variation in the road surface angle θr after the ignition switch 326 is shifted to the turn-off state cannot be applied to the road surface angle reference value.

Accordingly, the control ECU 100 according to the present embodiment executes the reference value storage processing in the following manner. Namely, upon receiving the turn-off signal of the ignition switch 326, the control unit 120 of the control ECU 100 executes the reference value storage processing when the output value of the vehicle speed sensor 312 received before the turn-off of the switch is a value (e.g., zero) indicating the stop of the vehicle 300. In the reference value storage processing, the road surface angle reference value and the vehicle posture angle reference value, which are stored in the RAM 124, are written in the storage unit 108. Further, when the output value of the vehicle speed sensor 312 received before the turn-off of the switch is a value (e.g., a value greater than zero) indicating the travelling of the vehicle 300, the above-described processing during vehicle travel is continued while the reference value storage processing is delayed.

Specifically, when the ignition switch 326 is shifted to the turn-off state, the IG monitor 114 transmits the Low level signal to the control unit 120. Upon receiving the Low level signal, the vehicle travel determining unit 1206 of the control unit 120 determines whether the most recent output value of the vehicle speed sensor 312 stored in the RAM 124, i.e., the output value stored in the last is a value indicating the stop of the vehicle 300. When the output value is a value indicating the stop of the vehicle 300, the vehicle travel determining unit 1206 transmits a vehicle stop signal indicating the stop of the vehicle 300 to the reference value writing unit 1204 and the adjustment instructing unit 1202. Upon receiving the Low level signal and the vehicle stop signal, the adjustment instructing unit 1202 stops the processing during vehicle travel. Upon receiving the Low level signal and the vehicle stop signal, the reference value writing unit 1204 executes the reference value storage processing and writes, in the storage unit 108, the road surface angle reference value and the vehicle posture angle reference value, which are stored in the RAM 124.

When the output value is a value indicating the travelling of the vehicle 300, the vehicle travel determining unit 1206 transmits a vehicle travelling signal indicating the travelling of the vehicle 300 to the reference value writing unit 1204 and the adjustment instructing unit 1202. Upon receiving the Low level signal and the vehicle travelling signal, the adjustment instructing unit 1202 continues to execute the processing during vehicle travel. Upon receiving the Low level signal and the vehicle travelling signal, the reference value writing unit 1204 delays the execution of the reference value storage processing. In this way, since variation in the road surface angle θr occurring after the ignition switch 326 is shifted to the turn-off state can be incorporated into the road surface angle reference value, it is possible to improve the accuracy of the auto-leveling control.

Further, when a failure of the vehicle speed sensor 312 or a connection failure between the vehicle speed sensor 312 and the control ECU 100 occurs, for example, while the vehicle is travelling, the recent output value of the vehicle speed sensor 312 stored in the RAM 124 when the ignition switch 326 is turned off is abnormal or the output value of the vehicle speed sensor 312 at least within a predetermined time before receiving the turn-off signal is not stored in the RAM 124. Accordingly, there is a possibility that it is not possible to determine the travelling or stop of the vehicle based on the output value of the vehicle speed sensor 312. For this reason, also when the received output value of the vehicle speed sensor 312 is a value indicating the abnormality of the vehicle speed sensor 312 or the output value of the vehicle speed sensor 312 at least within a predetermined time before receiving the turn-off signal is not received, the reference value writing unit 1204 continues to execute the processing during vehicle travel while delaying the reference value storage processing. The value indicating the abnormality of the vehicle speed sensor 312 corresponds to, for example, a vehicle speed that cannot be clearly achieved from the performance of the vehicle 300. This value can be properly set by a planner. The case where the output value of the vehicle speed sensor 312 at least within a predetermined time before receiving the turn-off signal is not received refers to a case where there is no the output value that is stored in the RAM 124 till a predetermined time from the time when the turn-off signal of the ignition switch 326 is received. Alternatively, the above case may refer to a case where the output value of the vehicle speed sensor 312 is not at all stored in the RAM 124. The "predetermined time" can be properly set on the basis of an experiment or simulation by a planner.

Specifically, the vehicle travel determining unit 1206 transmits the vehicle travelling signal to the reference value writing unit 1204 and the adjustment instructing unit 1202 even when the received output value of the vehicle speed sensor 312 is a value indicating the abnormality of the vehicle speed sensor 312 or the output value of the vehicle speed sensor 312 within a predetermined time before receiving the turn-off signal is not received. In this way, the execution of the reference value storage processing is delayed and the processing during vehicle travel is continued. As a result, since variation in the road surface angle θr occurring after the ignition switch 326 is shifted to the turn-off state can be incorporated into the road surface angle reference value, it is possible to improve the accuracy of the auto-leveling control.

Further, upon receiving the turn-off signal of the ignition switch 326, the control unit 120 determines whether to execute or delay the reference value storage processing based on the output value of the inclination sensor 116 when the output value of the vehicle speed sensor 312 received before the turn-off of the switch is a value indicating the travelling of the vehicle 300 or a value indicating the abnormality of the vehicle speed sensor 312 or when the output value of the vehicle speed sensor 312 within a predetermined time is not received. In the present embodiment, the control unit 120 determines that the vehicle 300 is stopped when variation per unit time of the output value of the inclination sensor 116 is equal to or less than a threshold and then executes the reference value storage processing. The threshold can be properly set by a planner and may be the same as the reference in the above-described "stabilized time," for example. Further, this threshold is stored, for example, in the storage unit 108.

Specifically, the vehicle travel determining unit 1206 transmits the vehicle travelling signal and determines whether or not variation per unit time of the output value of the inclination sensor 116 is equal to or less than a threshold when the output value of the vehicle speed sensor 312 received before the turn-off of the switch is a value indicating the travelling of the vehicle 300 or a value indicating the abnormality of the vehicle speed sensor 312 or when the output value of the vehicle speed sensor 312 is not received within a predetermined time. Generally, there is a high possibility that getting off of a passenger from the vehicle 300, etc., can be executed when the vehicle 300 is stopped immediately after the ignition switch 326 is turned off. In this case, the posture of the vehicle 300 is liable to be changed. Further, there is also a possibility that the ignition switch 326 immediately returns to the turn-on state from the turn-off state due to the abnormality of a power supply system including the ignition switch 326. Therefore, the determination is executed when a predetermined time has elapsed from the reception of the Low level signal. The "predetermined time" can be properly set on the basis of an experiment or simulation by a planner.

When variation in the output value of the inclination sensor 116 exceeds a threshold, the vehicle travel determining unit 1206 transmits the vehicle travelling signal to the reference value writing unit 1204 and the adjustment instructing unit 1202. Thereby, the execution of the reference value storage processing is delayed and the processing during vehicle travel is continued. When variation in the output value of the inclination sensor 116 is equal to or less than a threshold, the vehicle travel determining unit 1206 transmits the vehicle stop signal to the reference value writing unit 1204 and the adjustment instructing unit 1202. As a result, the processing during vehicle travel is stopped and the reference value storage processing is executed. When updating of the road surface angle reference value is the processing during vehicle travel that is executed while the vehicle is stopped, the reference value writing unit 1204 updates the road surface angle reference value and then stops the processing during vehicle travel when receiving the vehicle stop signal based on the output value of the inclination sensor 116 from the vehicle travel determining unit 1206.

Since the inclination sensor 116 is provided in the CPU 104, the supply of power is maintained even when the ignition switch 326 is shifted to the turn-off state and therefore the detected value can be continuously transmitted to the control unit 120.

Further, upon receiving the turn-off signal of the ignition switch 326, the control unit 120 writes abnormality information indicating abnormality of the vehicle speed sensor 312 in the storage unit 108 when the received output value of the vehicle speed sensor 312 is a value indicating the abnormality of the vehicle speed sensor 312 or the output value of the vehicle speed sensor 312 within a predetermined time is not received. Specifically, when the received output value of the vehicle speed sensor 312 is a value indicating the abnormality of the vehicle speed sensor 312 or the output value of the vehicle speed sensor 312 within a predetermined time is not received, the vehicle travel determining unit 1206 transmits, to the abnormality information generator 1212 of the control unit 120, an abnormality occurrence signal indicating that the output value of the vehicle speed sensor 312 is abnormal or indicating that the output is not received. Upon receiving the abnormality occurrence signal, the abnormality information generator 1212 generates and stores the abnormality information in the storage unit 108.

(Control when Ignition Switch is Shifted to Turn-on State)

In a state where the ignition switch 326 is turned off, there is almost no case that the vehicle 300 moves and the road surface angle θr is varied. Therefore, variation in the total angle θ from the turn off to the turn on of the ignition switch 326 can be estimated as variation in the vehicle posture angle θv. Thus, when the ignition switch 326 is shifted to the turn-on state, the adjustment instructing unit 1202 obtains the current vehicle posture angle θv by, as a first control after start-up, subtracting the road surface angle reference value read out from the storage unit 108, from the total angle θ obtained from the current output value of the inclination sensor 116. Then, the adjustment instructing unit 1202 stores the obtained vehicle posture angle θv as a reference value in the RAM 124. Further, the adjustment instructing unit 1202 generates an optical axis adjusting signal using the obtained vehicle posture angle θv. As a result, variation in the vehicle posture angle θv while the ignition switch 326 is turned off can be incorporated into the reference value and the optical axis θo can be adjusted to a proper position. Therefore, it is possible to improve the accuracy of the auto-leveling control.

Further, upon receiving the turn-on signal of the ignition switch 326, the abnormality information generator 1212 of the control unit 120 transmits the abnormality signal stored in the storage unit 108 to an indicator or the like of the vehicle 300 through the transmitter 122 when the abnormality information is generated and stored during the turn off of the ignition switch 326. In this way, it is possible to notify a driver or a repair person or the like that abnormality occurs in the vehicle speed sensor 312. The abnormality information generator 1212 may output the abnormality information in response to a request from an external device including a communication of the CAN system, etc.

Figure 5:
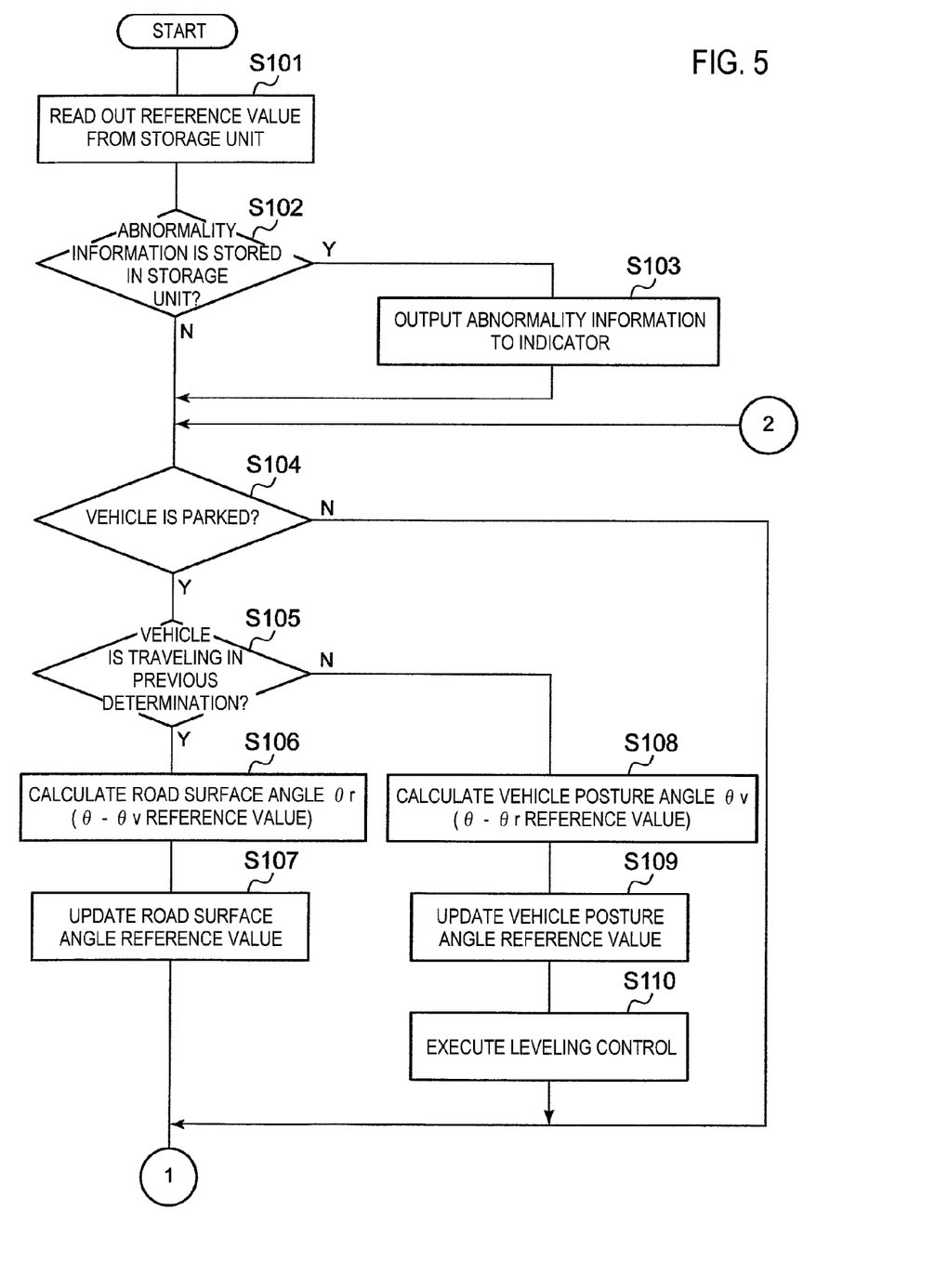
FIG. 5 is a flowchart showing an example of an auto-leveling control that is executed by the control ECU according to the illustrative embodiment.
Figure 6:
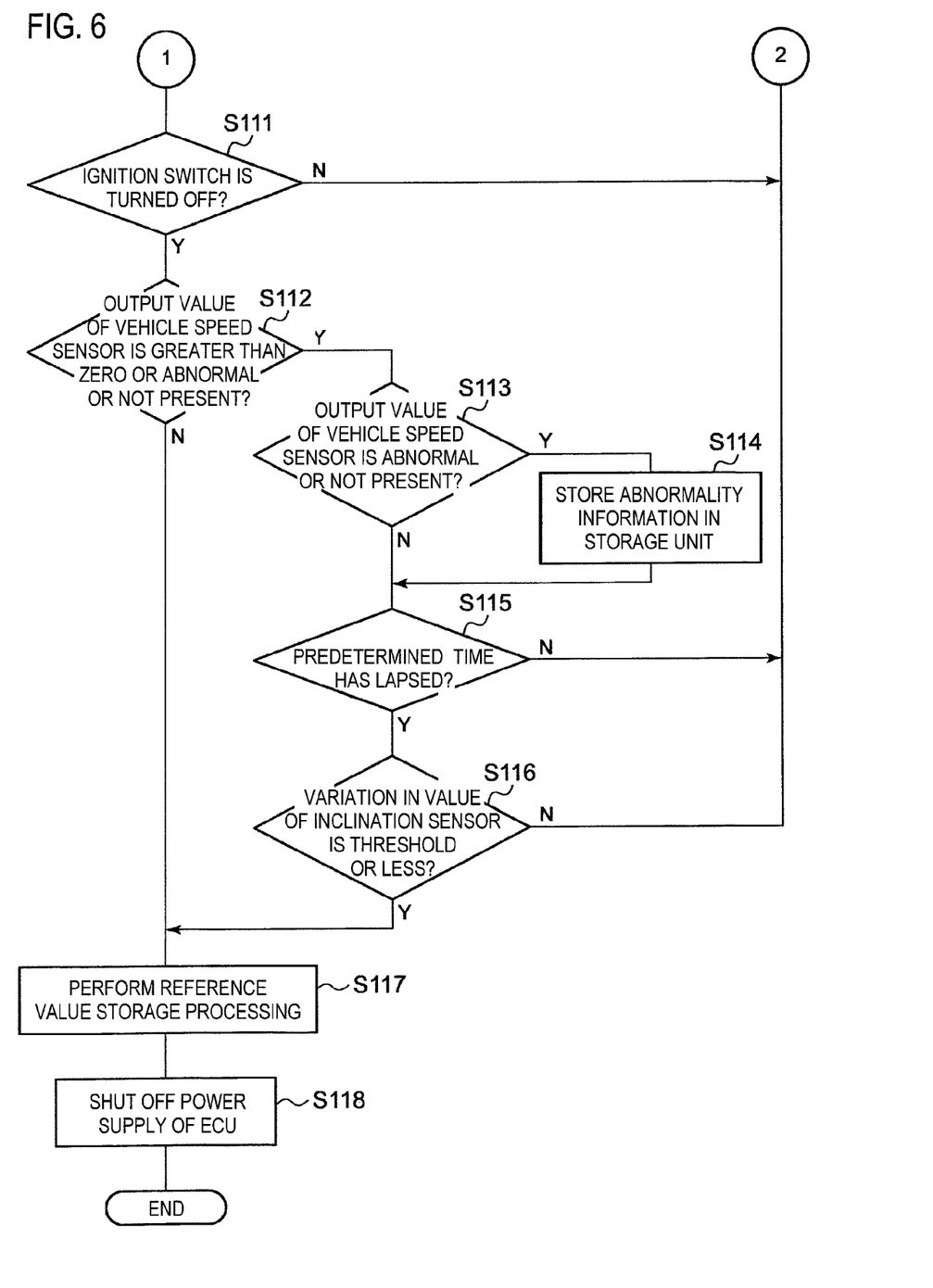
FIG. 6 is a flowchart showing an example of an auto-leveling control that is executed by the control ECU according to the illustrative embodiment.

FIG. 5 and FIG. 6 are flowcharts showing an example of the auto-leveling control that is executed by the control ECU according to the present embodiment. This flowchart is started when the ignition switch 326 is turned on and thus power is supplied to the control ECU 100 from the battery 328.

As shown in FIG. 5, first, the control ECU 100 reads out the road surface angle reference value and the vehicle posture angle reference value from the storage unit 108 when the ignition switch 326 is shifted to the turn-on state (S101). Subsequently, the control ECU 100 determines whether the abnormality information is stored in the storage unit 108 or not (S102). When the abnormality information is stored in the storage unit 108 (Y in S102), the control ECU 100 outputs the abnormality information to the indicator (S103).

Next, the control ECU 100 determines whether the vehicle 300 is parked or not (S104). When the abnormality information is not stored in the storage unit 108 (N in S102), the process proceeds to Step S104 without going through Step S103. When the vehicle 300 is not parked (N in S104), the control ECU 100 proceeds to Step S111 shown in FIG. 6. When the vehicle 300 is parked (Y in S104), the control ECU 100 determines whether or not the vehicle 300 is travelling (N in S104) in a previous parking determination in Step S104. When the vehicle is travelling in the previous determination (Y in S105), the control ECU 100 calculates the road surface angle θr by subtracting the vehicle posture angle reference value from the current total angle θ (S106). Then, the control ECU 100 updates the obtained road surface angle θr as a new road surface angle reference value and stores the new road surface angle reference value in the RAM 124 (S107). Then, the control ECU 100 proceeds to S111. When the vehicle is not travelling in the previous determination (N in S105), the control ECU 100 calculates the vehicle posture angle θv by subtracting the road surface angle reference value from the current total angle θ (S108). Then, the control ECU 100 updates the obtained vehicle posture angle θv as a new vehicle posture angle reference value and stores the new vehicle posture angle reference value in the RAM 124 (S109). Further, the control ECU 100 executes a leveling control using the obtained vehicle posture angle θv or the vehicle posture angle reference value (S110) and proceeds to S111.

In Step S111, the control ECU 100 determines whether or not the ignition switch 326 is shifted to the turn-off state (S111). When the ignition switch 326 is not shifted to the turn-off state (N in S111), the control ECU 100 proceeds to Step S104. When the ignition switch 326 is shifted to the turn-off state (Y in S111), the control ECU 100 determines whether the output value of the vehicle speed sensor 312 stored in the RAM 124 is greater than zero (that is a value indicating the travel of the vehicle) or a value indicating abnormality or whether the output value of the vehicle speed sensor 312 within a predetermined time is not stored in the RAM 124 (S112). When the ignition switch 326 is shifted to the turn-off state, the supply of power to the control ECU 100 through the control power supply circuit 112 is maintained. When the output value of the vehicle speed sensor 312 stored in the RAM 124 is zero (that is a value indicating the parking of the vehicle) (N in S112), the control ECU 100 proceeds to Step S117.

When the output value of the vehicle speed sensor 312 is greater than zero or a value indicating abnormality or whether the output value of the vehicle speed sensor 312 within a predetermined time is not stored in the RAM 124 (Y in S112), the control ECU 100 additionally determines whether the output value of the vehicle speed sensor 312 is a value indicating abnormality or whether the output value of the vehicle speed sensor 312 within a predetermined time is not stored in the RAM 124 (S113). When the output value of the vehicle speed sensor 312 is a value indicating abnormality or when the output value of the vehicle speed sensor 312 within a predetermined time is not stored in the RAM 124 (Y in S113), the control ECU 100 generates abnormality information and stores the generated abnormality information in the storage unit 108 (S114). Then, the control ECU 100 proceeds to Step S115. When the output value of the vehicle speed sensor 312 is not a value indicating abnormality and when the output value of the vehicle speed sensor 312 within a predetermined time is stored in the RAM 124 (N in S113), the control ECU 100 proceeds to Step S115 without going through Step S114. In Step S115, the control ECU 100 determines whether a predetermined time has lapsed (S115). When a predetermined time has lapsed (Y S115), the control ECU 100 determines whether variation per unit time of the output value of the inclination sensor 116 is equal to or less than a threshold (S116). When the variation is equal to or less than a threshold (Y in S116), the control ECU 100 proceeds to Step S117. When a predetermined time has not lapsed (N in S115) and the variation per unit time of the output value of the inclination sensor 116 is greater than a threshold (N in S116), the control ECU 100 proceeds to Step S104.

In Step S117, the control ECU 100 executes a reference value storage processing where the road surface angle reference value and the vehicle posture angle reference value, which are stored in the RAM 124, are written in the storage unit 108 (S117). When the road surface angle reference value and the vehicle posture angle reference value are completely written in the storage unit 108, the control ECU 100 stops the supply of power to the control ECU 100 from the battery 328 (S118) and ends the present flow.

As described above, in the control ECU 100 as a vehicle lamp control device according to the present embodiment, upon receiving the turn-off signal of the ignition switch 326, the control unit 120 executes the reference value storage processing when the output value of the vehicle speed sensor 312 received before the turn-off of the switch is a value indicating the stop of the vehicle 300. Further, when the output value of the vehicle speed sensor 312 received before the turn-off of the switch is a value indicating the travel of the vehicle 300 or a value indicating the abnormality of the vehicle speed sensor 312 or when the output value of the vehicle speed sensor 312 at least within a predetermined time is not received, the control unit 120 continues to execute the processing during vehicle travel while delaying the reference value storage processing. In this way, variation in the road surface angle θr can be more accurately reflected to the road surface angle reference value. As a result, it is possible to improve the accuracy of the auto-leveling control of the vehicle lamp.

The present invention is not limited to the above-described embodiment and modifications such as various design changes may be added to the above-described embodiment, based on the knowledge of those skilled in the art. The embodiments to which such modifications are added are also included in the scope of the present invention. New embodiments obtained by combinations of the above-described embodiment and the modifications include the effects of each of the above-described embodiment and the modifications, which are combined.

Although, in the above-described embodiment, an acceleration sensor has been used as the inclination sensor 116, the inclination sensor 116 may include a gyro sensor (an angular velocity sensor and an angular acceleration sensor) and a geomagnetic sensor, etc. Further, although, in the above-described embodiment, the inclination sensor 116 has been provided inside the CPU 104, the inclination sensor 116 may be provided outside the CPU 104, further, outside the control ECU 100. In this case, similar to the CPU 104, the inclination sensor 116 is preferably supplied with power from the battery 328 through the control power supply circuit 112 or supplied with power directly from the battery 328 so that the supply of power is maintained even after the turn-off of the ignition switch 326. Further, although, in the above-described embodiment, the road surface angle reference value and the vehicle posture angle reference value are stored in the storage unit 108 in the reference value storage processing, at least only the road surface angle reference value may be stored.

What is claimed is:

1. A vehicle lamp control device comprising:
    a receiver configured to receive an output value of an inclination sensor, an output value of a vehicle speed sensor and a signal indicating turn-on/off of a switch of a power supply configured to supply power to the control device,
    wherein the inclination sensor is configured to derive a total angle including a road surface angle and a vehicle posture angle, and the total angle is an inclination angle of a vehicle to a horizontal plane, the road surface angle is an inclination angle of a road surface to the horizontal plane and the vehicle posture angle is an inclination angle of the vehicle to the road surface;
    a control unit configured to control an optical axis of a vehicle lamp; and
    a storage unit configured to store a road surface angle reference value and a vehicle posture angle reference value in a non-volatile manner,
    wherein the control unit is configured to:
    a) hold the road surface angle reference value and the vehicle posture angle reference value in a volatile manner,
    b) generate an optical axis adjusting signal using the vehicle posture angle, which is obtained from the total angle and the held road surface angle reference value and hold the obtained vehicle posture angle as a new reference value, in response to variation in the total angle during the stop of the vehicle;
    c) avoid generating or outputting the optical axis adjusting signal or output an optical axis holding signal, and hold the road surface angle, which is obtained from the total angle and the held vehicle posture angle reference value, as a new reference value, in response to variation in the total angle during travelling of the vehicle; and
    d) in response to receiving the turn-off signal of the switch,
        d-1) when the output value of the vehicle speed sensor received before the turn-off of the switch is a value indicating the stop of the vehicle, write at least the road surface angle reference value of the held road surface angle reference value and the held vehicle posture angle reference value in the storage unit, and
        d-2) when the received output value of the vehicle speed sensor is a value indicating the travel of the vehicle or a value indicating abnormality of the vehicle speed sensor or when the output value of the vehicle speed sensor is not received at least within a predetermined time before receiving the turn-off signal, continue to execute the step (c) while delaying the step (d-1).

2. The vehicle lamp control device according to claim 1, wherein
    in response to receiving the turn-off signal of the switch, the control unit is further configured to determine whether to execute or delay the step (d-1) based on the output value of the inclination sensor, when the received output value of the vehicle speed sensor is a value indicating the travel of the vehicle or a value indicating abnormality of the vehicle speed sensor or when the output value of the vehicle speed sensor is not received at least within a predetermined time before receiving the turn-off signal.

3. The vehicle lamp control device according to claim 2, wherein the control unit is further configured to execute the step (d-1) when variation per unit time of the output value of the inclination sensor is a threshold or less.

4. The vehicle lamp control device according to claim 1, wherein
    in response to receiving the turn-off signal of the switch, the control unit is further configured to:
    write, in the storage unit, abnormality information indicating abnormality of the vehicle speed sensor, when the received output value of the vehicle speed sensor is a value indicating abnormality of the vehicle speed sensor or when the output value of the vehicle speed sensor is not received at least within a predetermined time before receiving the turn-off signal, and
    output the abnormality information in response to receiving the turn-on signal of the switch or in response to a request from an external device.

5. The vehicle lamp control device according to claim 1, wherein the control unit is further configured to maintain the supply of power from the power supply in the turn-off state of the switch.

* * * * *